United States Patent [19]

McGee

[11] 4,283,455

[45] Aug. 11, 1981

[54] PRODUCTION OF COVER FABRICS FOR V BELTS WHICH FUNCTION AS WEAR INDICATORS DUE TO DIFFERENT LAYER CHARACTERISTICS

[75] Inventor: James N. McGee, Pleasant Garden, N.C.

[73] Assignee: Burlington Industries, Inc., Greensboro, N.C.

[21] Appl. No.: 95,675

[22] Filed: Nov. 19, 1979

[51] Int. Cl.[3] ........................ B05D 5/06; B32B 25/02; B32B 25/08; B32B 25/10; F16G 5/06

[52] U.S. Cl. .................................... 428/240; 427/289; 427/290; 427/346; 427/365; 427/389.9; 427/407.1; 427/434.2; 428/244; 428/257; 428/261; 428/262; 428/519; 474/264; 474/271

[58] Field of Search ............... 428/240, 244, 257, 261, 428/262, 519; 74/231 P, 231 R; 427/289, 290, 365, 346, 389.9, 407.1, 434.2

[56] References Cited

U.S. PATENT DOCUMENTS

| | | | |
|---|---|---|---|
| 1,437,859 | 12/1922 | O'Neil . | |
| 2,518,220 | 8/1950 | Brown et al. . | |
| 2,732,002 | 1/1956 | Gardner et al. . | |
| 3,305,430 | 2/1967 | Hennemann . | |
| 3,393,115 | 7/1968 | Hainsworth et al. . | |
| 3,607,502 | 9/1971 | Margocchi et al. . | |
| 3,784,427 | 1/1974 | Griffin | 156/139 |
| 3,800,701 | 7/1975 | Watts et al. . | |
| 3,962,511 | 6/1976 | Foti | 428/246 |
| 4,062,989 | 12/1977 | Long . | |
| 4,080,694 | 3/1978 | Moore et al. . | |

*Primary Examiner*—James C. Cannon
*Attorney, Agent, or Firm*—Cushman, Darby & Cushman

[57] ABSTRACT

A cover fabric for a V belt having increased flex and wear-life, and a method of making the cover fabric. A fabric is bias cut into a continuous strip of fabric. The individual fibers in the continuous strip are impregnated with an elastomeric polymeric material effective to increase the flex and wear-life of the fabric when used as a cover fabric for V belts. This impregnation is accomplished by immersing the strip in a fluid mix having a viscosity of about 2000 cps or less, the mix including a fluid carrier, an elastomeric polymer (e.g. a polychloroprene compound) and a dark pigment. A coating of an elastomeric polymer (e.g. another polychloroprene compound) is applied to the strip, the strip is stretched in its width direction to increase the angular relation of the threads of the fabric relative to its longitudinal axis, and the thus coated strip is dried. The continuous strip is ultimately slit longitudinally of itself into a plurality of tapes, and the tapes are used to cover a V belt.

19 Claims, 2 Drawing Figures

CONTINOUS STRIP FORMATION
12
13
14
15
COATING
16
STRETCHING
18
DRYING
20
COOLING
22
SLITTING
24
BELT WRAPPING
26
10
CUT LINE 28
30

PRODUCTION OF COVER FABRICS FOR V BELTS WHICH FUNCTION AS WEAR INDICATORS DUE TO DIFFERENT LAYER CHARACTERISTICS

BACKGROUND AND SUMMARY OF THE INVENTION

This invention relates to improvements in the production of industrial fabrics intended for use in covering power transmission belts, commonly referred to as V belts, and the like. Conventional belt cover fabrics, such as in U.S. Pat. Nos. 3,784,427 and 4,062,989 (the disclosures of which are incorporated by reference herein) have been generally suitable for performing their intended function for normal V belt life.

In such power transmission belt cover fabric constructions, the end of normal wear life is typically indicated when the cover fabric becomes abraded enough to show the undyed white filaments or fibers making up the yarns of the cover fabric. While this has been a safe practice, V belt manufacturers are presently applying dye to the tubular or square woven cover fabrics before coating to improve the cosmetic effect of the raw cut fabric edge along the belt. It is felt by some producers that transmission belt life is extended by dyeing the white fiber components of the cover fabric to a darker shade. This "cosmetic" treatment has the effect of extending the usage of the transmission belt—sometimes dangerously. This is because such cosmetic effects do not extend the wear life of the V belt, but tend to unduly prolong replacement because of the longer time needed to detect abraded fibers.

According to the present invention there is provided an improved method for making cover fabrics for V belts and the like. The cover fabric so produced exhibits greatly improved wear-life compared to prior art cover fabrics. The present invention also overcomes the possibly dangerous cosmetic effect associated with present cover fabrics, without adversely affecting the improved wear life properties of cover fabrics according to the present invention.

This increase in cover fabric wear-life is accomplished by impregnating the fiber bundle of the yarns making up the fabrics employed (typically bias cut woven tubular fabric, although knitted or non-woven fabrics may also be suitable), so as to coat or encapsulate the individual fibers thereof, for example by passing a continuous strip of bias cut woven fabric into a fluid mixture of an elastomeric polymeric material. The polymeric material is preferably dissolved or emulsified in a fluid mix having a relatively low viscosity in order to accomplish complete impregnation of the fiber bundle. The desired viscosity is about 2000 cps or less, and is preferably 1500 cps±250 cps. Where pressurized or evacuated systems are available, or where exceptionally long paths in dip tanks are provided, complete impregnation can be achieved utilizing fluid mixes having viscosities somewhat higher than 2000 cps, and may be as high as 40,000 cps.

According to the present invention, the impregnating fluid mix also preferably includes a dark pigment, such as conductive black. One purpose of the pigment is to improve sales appeal by coloring the fibers to eliminate the objectionable whiteness of the raw cut edges of the fabric. However, this pigmenting effect is to be distinguished from dyeing. If dyeing is practiced, it is difficult to determine when abrasion of the fabric fibers has occurred, necessitating belt replacement.

According to the present invention, the impregnating and encapsulating polymeric materials holds the pigment on the fabric and fiber components until the pigment is abraded off with the coating. When such abrasion occurs, white fibers begin to show, signalling the time for belt replacement. Greater flex life and greater wear life is nevertheless achieved, because of the polymeric encapsulation of the individual fibers in the yarn bundle of the cover fabric, which protects such fibers from premature abrasion. Nevertheless, when there is serious abrasion the white fibers begin to appear, signalling that the belt is worn and should be replaced.

The fiber bundle impregnation according to the present invention is practiced by passing the continuous strip of bias cut fabric into a dip tank, and removing excess fluid mix by utilizing a pair of textile pad rolls. After impregnation the cover fabric is treated by following the conventional steps of U.S. Pat. Nos. 3,784,427 and 4,062,989. That is, an elastomeric coating is applied to the fabric strip, the strip is stretched in its width direction to increase the angular relation of the yarns or threads of the fabric relative to its longitudinal axis, and the thus coated strip is dried. There is usually no drying between impregnation and coating, although in some circumstances that may be feasible. After coating and drying, the continuous strip is longitudinally slit into a plurality of tapes, and the tapes are used for covering a V belt or the like.

It is therefore the primary object of the present invention to provide an improved cover fabric for V belts or the like, and a method of production thereof. This and other objects of the invention will become clear from the detailed description of the invention, and from the appended claims.

DETAILED DESCRIPTION

Figures 1, 2:
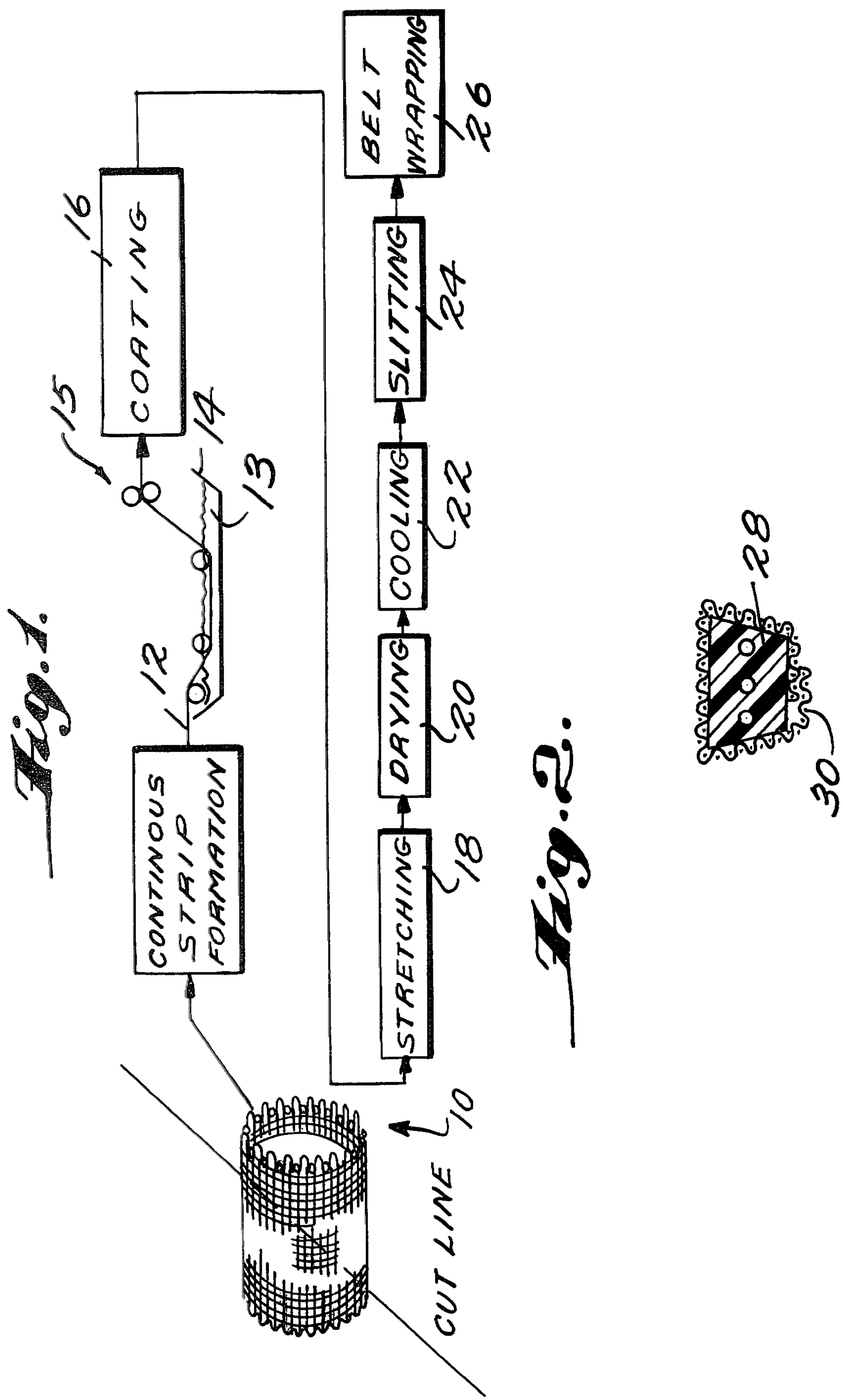
FIG. 1 is a flow diagram of the preferred method according to the present invention.
FIG. 2 is a cross-sectional view illustrating a V belt covered with fabric produced according to the present invention.

A tubular woven fabric that provides the starting point for practicing the method according to the present invention is illustrated generally at 10 in FIG. 1. A typical fabric is tubular woven from 35 filling picks per inch and 35 warp ends per inch using 7.5 singles yarns of a 50/50 nylon/cotton blend or a 50/50 polyester/cotton blend, although various weaves, yarns, fibers, and blends will be suitable according to the invention. The interwoven filling picks or weft yarns normally intersect the warp yarns at an angle of about 90°. The tubular fabric is bias cut into a continuous strip of fabric, the slitting normally being at an angle of 15°, 30°, 45° or 60° (angles between about 15° and 60° are commonly used). The tension encountered in bias cutting tends to pull down the angle between the warp and weft yarns between 80° and 90°, and normally about 85°. The continuous fabric strip 12 formed during slitting is then treated with a fluid mix of elastomeric polymeric material to impregnate in the yarn bundles thereof and to encapsulate the individual fibers of such yarn bundles with the polymeric material effective to increase the wear-life of the fabric when used as a cover fabric for V belts or the like. This is preferably accomplished by immersing the strip 12 in a fluid mix 13 in a conventional dip tank 14 or the like, which is normally maintained at room temperature. The strip 12 is then passed through two standard textile squeeze or pad rolls illustrated at 15 for leveling and for removing excess fluid mix. By practicing the impregnation step according to the present invention, the flex life of the cover fabric is greatly extended, and by utilizing a dark pigment rather than a dyestuff in the fluid mix, any cosmetic objection due to the whiteness of the raw cut edge of the fabric strip 12 is eliminated, without eliminating the wear life indicator effect when the fabric becomes worn by abrasion.

The fluid mix 13 according to the present invention preferably has a low viscosity so that impregnation of the fibers is insured. Normally, the room temperature viscosity will be about 2000 cps or less, and preferably 1500 cps±250 cps. However, in circumstances where exceptionally long pathways in dip tanks can be provided, or where it is desirable to impregnate the fabric strips under pressure or with the aid of vacuum or increased temperature, then fluid mixes having a viscosity somewhat higher than 2000 cps may be utilized, and room temperature viscosities up to 40,000 cps may be suitable in such cases.

The presently preferred polymeric material for use in the fluid mix 13 is Neoprene (a polychloroprene (CR) product of DuPont). However, a wide variety of elastomeric polymeric materials are suitable for use in the invention, such as other chloronated polyethylenes, various chlorosulphonated polyethylenes (such as Hypalon, also a DuPont product), natural rubber, natural rubber blended with styrene butadiene type synthetic rubbers, and ethylene polypropylene diene monomer (usually blended with other polymers).

A solvent mix may be provided comprising a major portion of a polychloroprene elastomeric polymer (such as Neoprene), a minor portion of dark pigment, and a suitable solvent such as toluene; or an aqueous mix comprising the same polymer and pigment with water as the fluid carrier. The solids content of the solvent mix normally will be 2 to 20%, the solids content depending upon the exact polymer and solvent utilized, the purpose being to provide a solvent mix of suitable viscosity permitting effective yarn bundle impregnation to coat the individual fibers. The preferred dark pigment is a conductive carbon black.

An example of a particularly useful solvent mix according to the present invention is as follows:

| Ingredient | Parts |
|---|---|
| Neoprene GN or GNA | 26.31 |
| Neoprene GRT | 26.31 |
| Black XC-72, a conductive black | 26.31 |
| Zinc Oxide, a vulcanizer | 2.63 |
| Magnesium Oxide, a vulcanizer and and scorch inhibitor | 2.10 |
| Stearic Acid, a lubricant | 0.53 |
| Octamine, an antioxidant | 2.10 |
| Cis-4 - Poly butadiene, for resilience and abrasion | 0.80 |
| Factice, an extender and plasticizer | 3.95 |
| Schenectady SP567, a phenolic resin | 3.95 |
| Natro Rez #10, a coumarone - indene resin | 4.48 |
| | 100.00 |
| Toluene (to 10% solids) | 900.00 |
| | 1000.00 |

The mix described above will have a viscosity of approximately 1500 cps.

When employing an aqueous mix, the solids content may vary from that provided for a solvent mix, for example from 5 to 50% solids, again the purpose being to provide a mix of suitable viscosity that will permit effective impregnation of the fibers in the yarn bundle. An example of a suitable aqueous mix for practicing the impregnation according to the invention is:

| Ingredients | Parts |
|---|---|
| Neoprene L-101 | 425 |
| Cymel 303, a melamine resin | 40 |
| PC-1, a magnesium chloride catalyst | 40 |
| Picconol 400, a tackifier | 180 |
| Aqua Black 15, a conductive black | 100 |
| Bostex 24, an antioxidant | 16 |
| E-678, a thickener | 20 |
| ASE60 in Ammonia, a thickener | 20 |
| Water | 136 |

The mix described above will have 44% total solids and a viscosity of about 1500 cps.

After impregnation of the fabric strip 12, the rest of the steps that are practiced for producing the end product cover fabric are substantially conventional, such steps being more fully described in U.S. Pat. Nos. 3,784,427 and 4,062,989 (the disclosures of which are incorporated by reference herein). The strip 12 may be dried directly after impregnation but preferably is not. After impregnation, an elastomeric coating (similar in composition to the impregnating mix, although less fluid, may be employed if a higher viscosity is desired) is applied to the strip at station 16 which is also normally maintained at room temperature.

Suitable coating compositions according to the invention may be made using the same elastomeric polymers listed above for the impregnating composition. Preferably the coating composition has a higher solids content in the range of 46–48%, although the solids content may range from 30 to 60%. The coating composition is preferably also pigmented with a conductive carbon black, and it may be made with a solvent or an aqueous base. The invention has been tested with good results using an aqueous base impregnating material, followed by application of a solvent base coating without intermediate drying.

After coating, the strip is stretched in its width direction to increase the angular relation of the threads of the fabric (see U.S. Pat. No. 3,784,427) relative to its longitudinal axis at a stretching station 18. The stretching step changes the angle between the warp and weft yarns of the bias cut fabric strip to an angle in the range of 90°–125°, preferably about 110°. The strip is then passed on to the drying station 20 for fluid carrier (solvent or water) removal, and cooled to room temperature at cooling station 22 by passing it over cooling cans or the like. Drying is normally carried out at a temperature in the range of 125°–275° F., the purpose being to remove excess fluid carrier from the impregnating and coating materials. The polymeric material on the treated product is not cured at this stage however. Curing normally takes place when the treated product is subjected to its intended end use. In the case of a V belt, curing would take place after the treated cover fabric 30 is wrapped around the V belt 28 (see FIG. 2).

After drying and cooling, the treated fabric strip may then be collected and shipped to another facility for actually forming the strip into a configuration suitable for cover fabric use, and for covering the belts, or these steps can be practiced at the same site. In any event, ultimately the dried strip passes to a slitting station 24 where the continuous strip is slit longitudinally of itself into a plurality of long tapes, each of which is of sufficient width to completely cover a V belt, and at station 26 the tapes are used to cover the V belt to provide the finished product. A schematic representation of the finished product is illustrated in FIG. 2, the V belt 28 being wrapped in the longitudinal direction by the tape of cover fabric 30 that is formed according to the present invention.

The power transmission belt cover fabric produced according to the present invention has been found to provide substantially improved flex life and wear life as compared to prior art V belt cover fabrics. Additionally, it is improved cosmetically since there are no adverse cosmetic effects along the raw cut edge of the belt. The white fibers do not appear prematurely, nor is their appearance unduly delayed by dyeing (dyeing tends to fully penetrate the fiber in the yarn, turning the fiber to the color of the dye and tending to prevent detection of an abraded fiber; the present invention deliberately avoids dyeing in favor of coloring only the fiber surface by pigmenting). Since each of the fibers of the present cover fabric is encapsulated with the impregnating polymeric material, the wear life is believed to be a surprising 2-3 times the normal wear life.

While the invention herein has been shown and described in what is presently conceived to be the most practical and preferred embodiment thereof, it will be apparent to those of ordinary skill in the art that modifications thereof may be made within the scope of the invention, which scope is to be accorded the broadest interpretation of the appended claims so as to encompass all equivalent methods, compositions and fabrics.

What is claimed is:

1. An industrial cover fabric for power transmission belts or the like, consisting of a strip of bias cut fabric woven from blended fiber yarns, the individual fibers of said yarns being encapsulated in a dried pigmented elastomeric polymer, and said yarns and encapsulated fibers being over coated with a dried elastomeric polymer, the angular orientation between the warp and weft yarns of said woven fabric being increased to an angle greater than 90° and being held in that position by the dried elastomeric coating, said industrial cover fabric having greatly increased wear life by virtue of said individual fiber encapsulation, the pigment in said pigmented elastomeric polymer being adapted to abrade off with said polymer to reveal unpigmented portions of said fibers when said fabric has outlived its usefulness.

2. The product of claim 1 wherein the elastomeric polymer is a polychloroprene, and the pigment is a conductive carbon black.

3. A bias cut woven fabric cover for a V belt or the like, the fabric cover being produced from a continuous fabric strip by impregnating the individual fibers in the strip with a fluid mix including an elastomeric polymer, a dark pigment and a fluid, and having a viscosity of about 2000 cps or less; applying an elastomeric coating to the strip; and drying the strip.

4. A bias cut woven fabric cover for a V belt or the like, the fabric cover being produced from a continuous fabric strip by impregnating the individual fibers in the strip with an elastomeric polymeric material effective to increase the wearlife of the fabric when covering a V belt or the like, applying an elastomeric coating to the strip, and drying the thus coated strip.

5. A method of making a cover fabric for V belts or the like, comprising the steps of (a) cutting a fabric into a continuous strip of fabric;
(b) impregnating the individual fibers in the continuous strip of fabric with an elastomeric polymeric material effective to increase the wearlife of the fabric when used as a cover fabric for V belts or the like;
(c) applying an elastomeric coating to the strip;
(d) stretching the strip in its width direction to increase the angular relation of the threads of the fabric relative to its longitudinal axis; and
(e) drying the thus coated strip.

6. A method as recited in claim 5 wherein step (b) is practiced by immersing the strip in a low viscosity fluid mix of polymeric material, and removing excess mix, prior to practicing step (c).

7. A method as recited in claim 6 wherein excess mix is removed utilizing a pair of textile pad rolls through which the fabric passes after immersion in a dip tank.

8. A method as recited in claim 5 wherein steps (c) and (d) are practiced directly after step (b), with no drying in between.

9. A method as recited in claim 5 comprising the further step of, simultaneously with step (b), improving the cosmetic effect of the fabric by coloring the fabric fibers with a dark pigment.

10. A method as recited in claims 5, 6, 8, or 9 wherein step (b) is accomplished by impregnating the fabric with a fluid mix having a viscosity of about 2000 cps or less.

11. A method as recited in claims 5, 6, 8, or 9 wherein step (b) is accomplished by impregnating the fabric with a fluid mix comprising an elastomeric polymer and a dark pigment.

12. A method as recited in claims 5, 6, 8, or 9 wherein step (b) is accomplished by impregnating the fabric with a fluid mix comprising a major portion of an elastomeric polymer and a minor portion of dark pigment, and the fluid mix having a viscosity of about 2000 cps or less.

13. A method as recited in claims 5 or 9 wherein step (b) is accomplished by impregnating the fabric with a solvent mix comprising a major portion of an elastomeric polychloroprene compound and a minor portion of dark pigment, and the solvent mix having a solids range of about 2-20%, and a viscosity of about $1500 \pm 250$ cps.

14. A method as recited in claims 5 or 9 comprising the further steps of: slitting the continuous strip longitudinally of itself into a plurality of tapes for covering a V belt or the like.

15. A method as recited in claim 5 wherein the fabric step (a) is accomplished by slitting the fabric to obtain an angle of between 15° and 60°.

16. A method of treating a bias cut woven fabric continuous strip so that it is suitable for use as a cover fabric for V belts or the like, comprising the steps of (a) impregnating the individual fibers in the strip with a fluid mix including an elastomeric polymer, a dark pigment, and a fluid carrier, said fluid mix having a viscosity of about 2000 cps or less;
(b) applying an elastomeric coating to the strip; and
(c) drying the strip.

17. A method as recited in claim 16 wherein a conductive black is employed as the dark pigment.

18. A method as recited in claim 16 wherein the fluid carrier is a solvent, and the fluid mix is a solvent mix.

19. A method as recited in claim 16 wherein the fluid carrier is water, and the fluid mix is an aqueous mix.

* * * * *